US009678341B2

(12) United States Patent
Kim et al.

(10) Patent No.: US 9,678,341 B2
(45) Date of Patent: Jun. 13, 2017

(54) HEAD-UP DISPLAY APPARATUS

(71) Applicant: LG ELECTRONICS INC., Seoul (KR)

(72) Inventors: Dongwook Kim, Seoul (KR); Minseok Ku, Seoul (KR); Kyoung Ii Lee, Seoul (KR); Dong Ha Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/476,318

(22) Filed: Sep. 3, 2014

(65) Prior Publication Data

US 2015/0226965 A1 Aug. 13, 2015

(30) Foreign Application Priority Data

Feb. 7, 2014 (KR) .................. 10-2014-0014001

(51) Int. Cl.
G03F 5/00 (2006.01)
G02B 27/01 (2006.01)
G02B 27/22 (2006.01)
G02B 27/28 (2006.01)

(52) U.S. Cl.
CPC ......... *G02B 27/0101* (2013.01); *G02B 27/01* (2013.01); *G02B 27/225* (2013.01); *G02B 27/2214* (2013.01); *G02B 27/283* (2013.01); G02B 2027/0118 (2013.01); G02B 2027/0141 (2013.01)

(58) Field of Classification Search
CPC G02B 27/2214; G02B 27/26; G02B 27/0172; G02B 2027/0174; G02B 27/22; G02B 27/0103; G02B 27/2228; G02B 27/016; G02B 27/286; G02B 26/0816; G02B 27/2235; G02B 27/2221; G02B 27/2242; G02B 27/283; G02B 27/01; G02B 27/126
USPC .... 359/463, 464, 465, 466, 467, 477, 13, 14
See application file for complete search history.

(56) References Cited

U.S. PATENT DOCUMENTS

| 5,320,534 | A | 6/1994 | Thomas | |
|---|---|---|---|---|
| 7,551,994 | B2* | 6/2009 | Odinak | B60K 35/00 340/995.15 |
| 2011/0235185 | A1 | 9/2011 | Kanamori | |
| 2013/0188259 | A1* | 7/2013 | Nakamura | G02B 27/0101 359/630 |

(Continued)

FOREIGN PATENT DOCUMENTS

JP 2007-264529 A 10/2007
JP 2007264529 A * 10/2007

(Continued)

*Primary Examiner* — Jade R Chwasz
(74) *Attorney, Agent, or Firm* — Birch, Stewart, Kolasch & Birch, LLP

(57) ABSTRACT

A head-up display (HUD) apparatus and a method of using the HUD apparatus are described. The HUD apparatus includes a first optical module configured to display a two dimensional (2D) image, a second optical module configured to display a three dimensional (3D) image and arranged at a predetermined angle relative to the first optical module, a separation module arranged on an optical path of the first and second optical modules to reflect a light of the first optical module and to project a light from the second optical module, and an optical system configured to output the light having passed the separation module.

16 Claims, 5 Drawing Sheets

(56) References Cited

U.S. PATENT DOCUMENTS

2015/0116197 A1* 4/2015 Hamelink ............... G06F 3/013
                                                                  345/156

FOREIGN PATENT DOCUMENTS

| JP | 2014-10418 A | 1/2014 |
|----|--------------|--------|
| KR | 10-1291408 B1 | 7/2013 |

* cited by examiner

HEAD-UP DISPLAY APPARATUS

Pursuant to 35 U.S.C.§119(a), this application claims the benefit of earlier filing date and right of priority to Korean Patent Application No.10-2014-0014001, filed on Feb. 7, 2014, the contents of which are hereby incorporated by reference in their entirety.

BACKGROUND OF THE DISCLOSURE

Field of the Invention

The teachings in accordance with the exemplary embodiments presented by this disclosure generally relate to a head-up display (HUD) configured to project both two dimensional (2D) and three dimensional (3D) images.

Background of the Invention

In general, an instrument panel is installed next to a steering wheel to transmit vehicle related-information to a driver. The instrument panel is arranged to indicate engine revolution, current vehicle speed, engine temperature, amount of fuel and the like. Recently, the trend is that an analogue type instrument panel is changed to a digital type instrument panel to inform the driver of travel distance, fuel efficiency, mileage and other vehicle-related information.

Meantime, concomitant with generalization of position-based services using a commercial GPS (Global Positioning System), a navigation system capable of visually and audibly road-guiding a driver is mounted in a separate or a built-in manner in a vehicle. However, the navigation system is a hindrance to safe driving, because a driver must frequently move his or her view field from the vehicle's windshield to a navigation screen in order to view information transmitted by the navigation system. Furthermore, vehicle-related information other than travel path guide information must be obtained separately to scatter the view field when information on vehicle driving environment is to be checked.

In order to solve the aforementioned disadvantages, HUDs have been recently adopted for vehicles to provide various vehicle-related information during vehicle driving or airplane flying within a scope not deviating from a view field of a driver, (i.e., not deviating from a front view of the driver). The HUDs have been initially developed for providing flying information to an aviator by being mounted to an airplane, particularly to a fighter plane.

Thus, the vehicle-intended HUDs have been adopted from the principle of HUDs mounted on an airplane. The vehicle HUD includes a display unit having a projection screen, onto which vehicle information (speed, travel distance, RPM, etc.) of the instrument panel is projected on a front window within a view field of a driver by an image-producing unit and optionally by an optical module to allow the driver to easily learn the travel information even if the driver is in the midst of driving a vehicle, whereby the driver can drive safely by recognizing important travel information. Related patents can be found from Korea Registered Patents including Patent No. 10-1291408.

However, conventional HUDs are configured to provide only a two dimensional (2D) screen, which are limited to the presentation of simple drawings or character information on a limited size imaginary screen. Particularly, a HUD screen cannot help but be limited in size due to various regulations, and therefore is insufficient in size to provide a relatively large amount of information including travel guide. Furthermore, a virtual image enlarged by an optical system is formed by being fixed to a designed depth to allow transmission of only 2D information. Of course, although technical ideas of adding other virtual images have been disclosed by improving the optical system, this type of configuration suffers from disadvantages of decreased daytime visibility due to loss of light caused by structural limits, and position of virtual images cannot but be fixed. Thus, demand on development capable of providing more information within a limited size of screen is required.

SUMMARY

The present disclosure has been made to solve the foregoing disadvantages of the prior art and therefore an object of certain embodiments of the present disclosure is to provide a HUD apparatus configured to provide more information within a limited size of screen.

Technical subjects to be solved by the present disclosure are not restricted to the above-mentioned description, and any other technical problems not mentioned so far will be clearly appreciated from the following description by the skilled in the art.

In order to achieve at least the above objects, in whole or in part, and in accordance with the purposes of the disclosure, as embodied and broadly described, and in one general aspect of the present invention, there is provided a HUD apparatus, the HUD apparatus comprising: a first optical module configured to display a two dimensional (2D) image; a second optical module configured to display a three dimensional (3D) image and arranged at a predetermined angle relative to the first optical module; a separation module arranged on an optical path of the first and second optical modules to totally reflect a light of the first optical module and to project a light from the second optical module; and an optical system configured to output the light having passed the separation module.

Preferably, but not necessarily, the first optical module may include a 2D display panel and a first backlight unit.

Preferably, but not necessarily, the second optical module may include a 3D display panel and a second backlight unit.

Preferably, but not necessarily, the separation module may be a polarizing beam splitter (PBS) configured to filter a polarization direction of light from the first and second optical modules.

Preferably, but not necessarily, the first and second optical modules may be perpendicularly arranged to each other.

Preferably, but not necessarily, the first and second optical modules may be selectively operated.

Preferably, but not necessarily, the first and second optical modules may be simultaneously operated.

Preferably, but not necessarily, the first optical module may include a 2D display panel and a first backlight unit configured to provide text and figurative information, and the second optical module may include a 3D display panel and a second backlight unit in one of a lenticular method and a parallax barrier method configured to provide navigation information using a depth adjustment of a virtual screen.

Preferably, but not necessarily, a position of the virtual screen formed by the second optical module may be changed by vehicle speed and travel environment information.

Preferably, but not necessarily, focus of position of the virtual screen may be set on a far distance to match a view field of a driver when a vehicle travels at a high speed, and the virtual screen is moved to a near distance of the view field of a driver when a vehicle travels at a slow speed.

Preferably, but not necessarily, the separation module may include a reflective prism using a total reflection and projection of light from the first and second optical modules, and the light of the first and second optical modules may be transmitted without loss using an inner total reflection and projection of light from the reflective prism.

Preferably, but not necessarily, the first optical module includes a 2D display panel and a first backlight unit, and the second optical module includes a 3D display panel and a second backlight unit.

Preferably, but not necessarily, size of an output screen of the second optical module may be controlled in association with vehicle speed.

Preferably, but not necessarily, the 3D screen of the second optical module may increase to a maximum when a vehicle is in a stationary state, and decrease to a minimum when a vehicle is in a travel state.

Preferably, but not necessarily, brightness of the first and second optical modules may be variably controlled in response to vehicle speed.

Preferably, but not necessarily, brightness of the first and second optical modules may be brightest when a vehicle is in a stationary state, and darkest when a vehicle is in a travel state.

An exemplary embodiment of the present disclosure thus discussed has an advantageous effect in that a 2D screen and a 3D screen can be selectively or simultaneously outputted to provide a maximum amount of information in a limited size of screen, because a 2D display unit and a 3D display unit are vertically arranged, and a separation module is mounted that is so formed as to reflect no loss of light from the 2D and 3D display units.

Another advantageous effect is that a driver can view a bright quality of virtual screen even in day light, because almost no loss of light occurs during reflection of light from the separation module to allow light generated from the 2D display unit and the 3D display unit to be transmitted to a driver as is.

Still another advantageous effect is that an additional space can be minimized when the HUD apparatus is mounted on a vehicle, because the apparatus can be maintained as it is volume-wise when compared with a conventional HUD apparatus.

Still further advantageous effect is that apparatus stability is excellent, because enclosures including an optical system are secured at an optimal state during initial installation, and works like image position adjustment or 3D image depth adjustment can use data processing afterwards.

DETAILED DESCRIPTION

Now, exemplary embodiments of the present invention will be described in detail with reference to the accompanying drawings.

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

In describing the present disclosure, the size and relative sizes of layers, regions and/or other elements may be exaggerated or reduced for clarity. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter.

Figure 1:
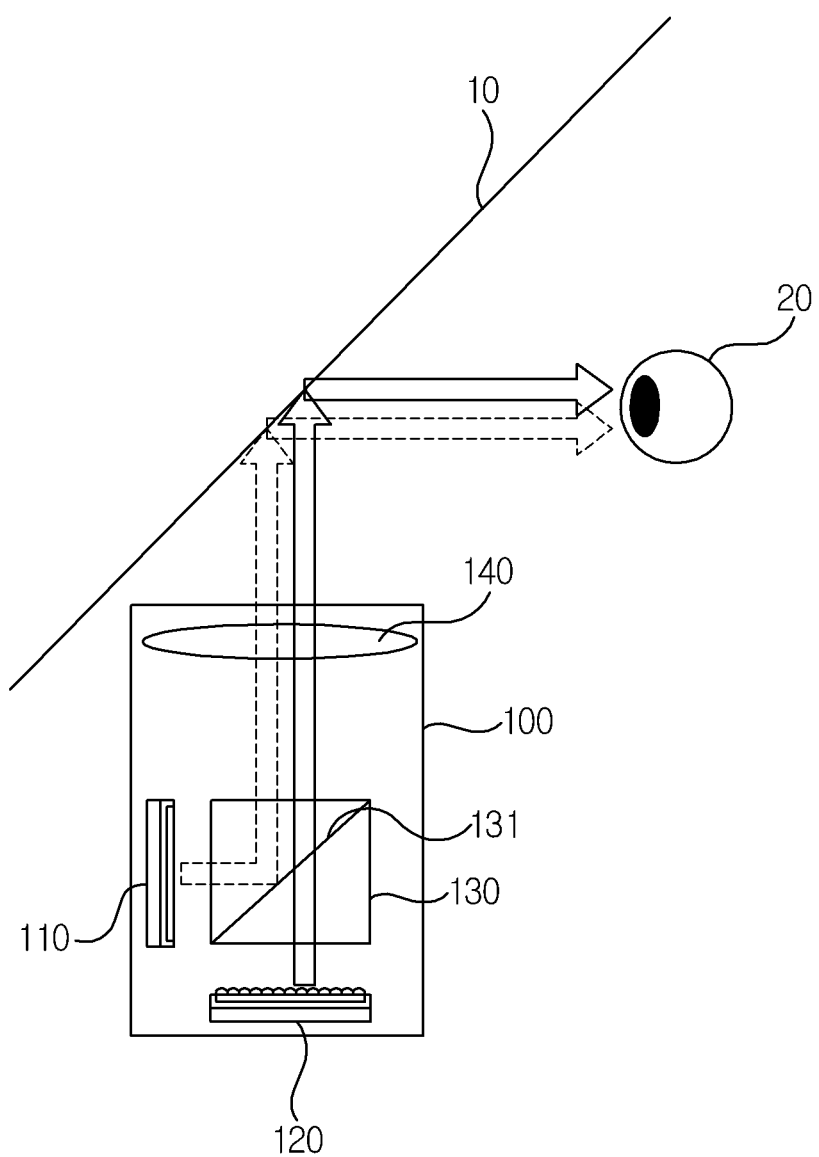
FIG. 1 is a schematic structural view illustrating a HUD apparatus according to an exemplary embodiment of the present disclosure.
Figure 2:
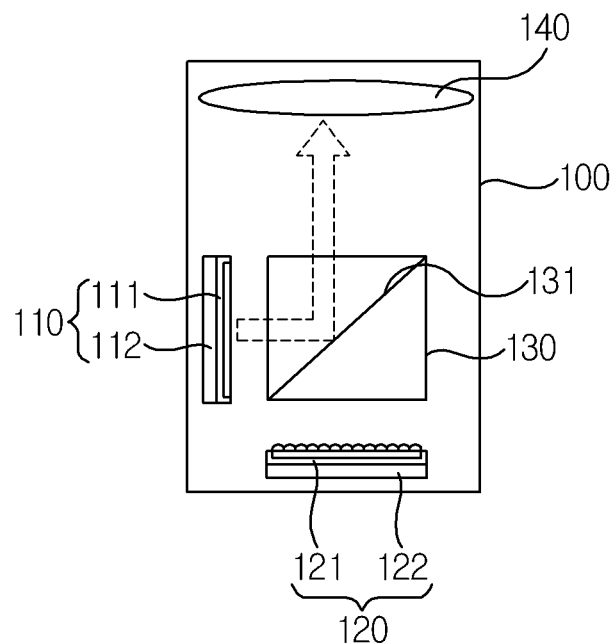
FIG. 2 is a schematic view illustrating an operational state of a first optical module.
Figure 3:
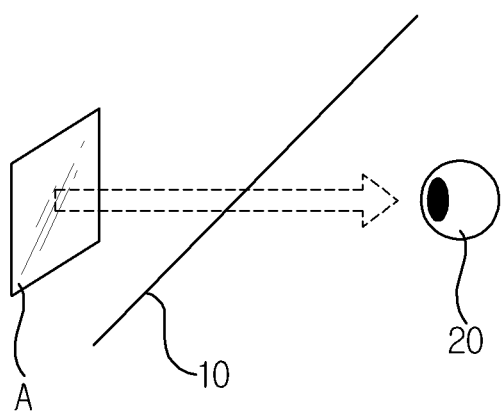
FIG. 3 is a schematic view illustrating a state in which a 2D screen is formed in a virtual image.
Figure 4:
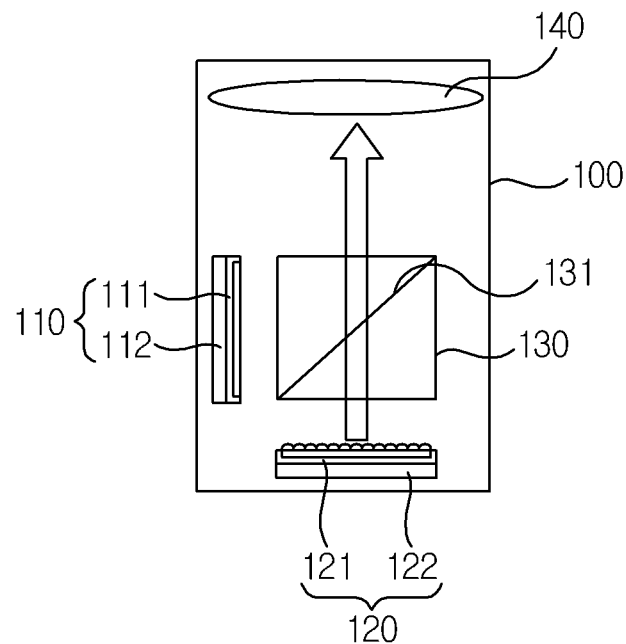
FIG. 4 is a schematic view illustrating an operational state of a second optical module.
Figure 5:
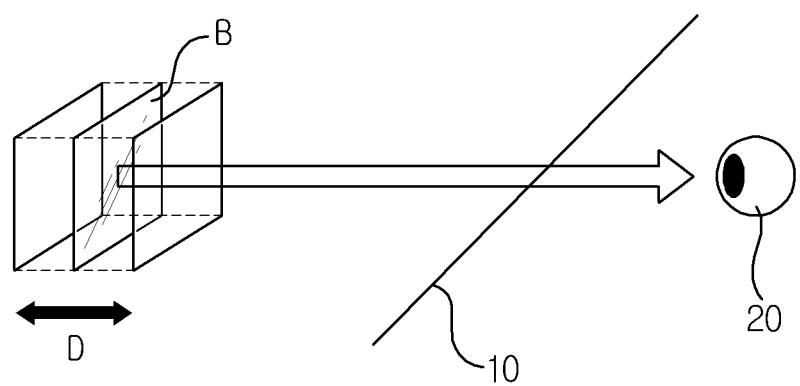
FIG. 5 is a schematic view illustrating a state in which a 3D screen is formed in a virtual image.
Figure 6:
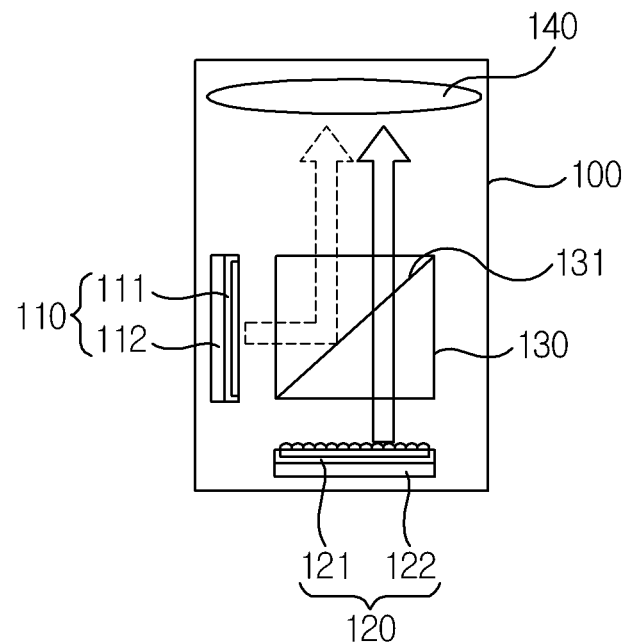
FIG. 6 is a schematic view illustrating a state in which first and second optical modules are all in operation.
Figure 7:
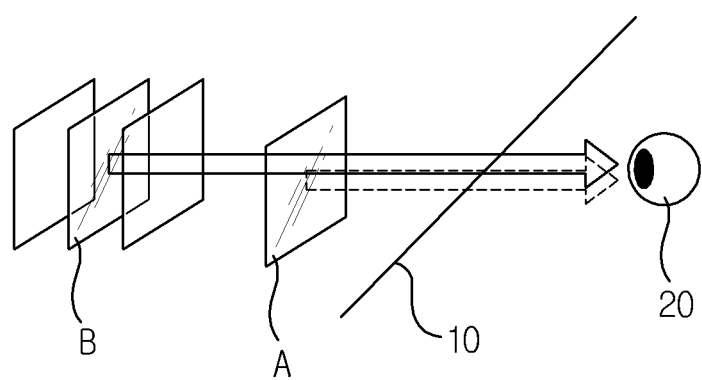
FIG. 7 is a schematic view illustrating a state in which 2D and 3D screens are formed in virtual images.
Figure 8:
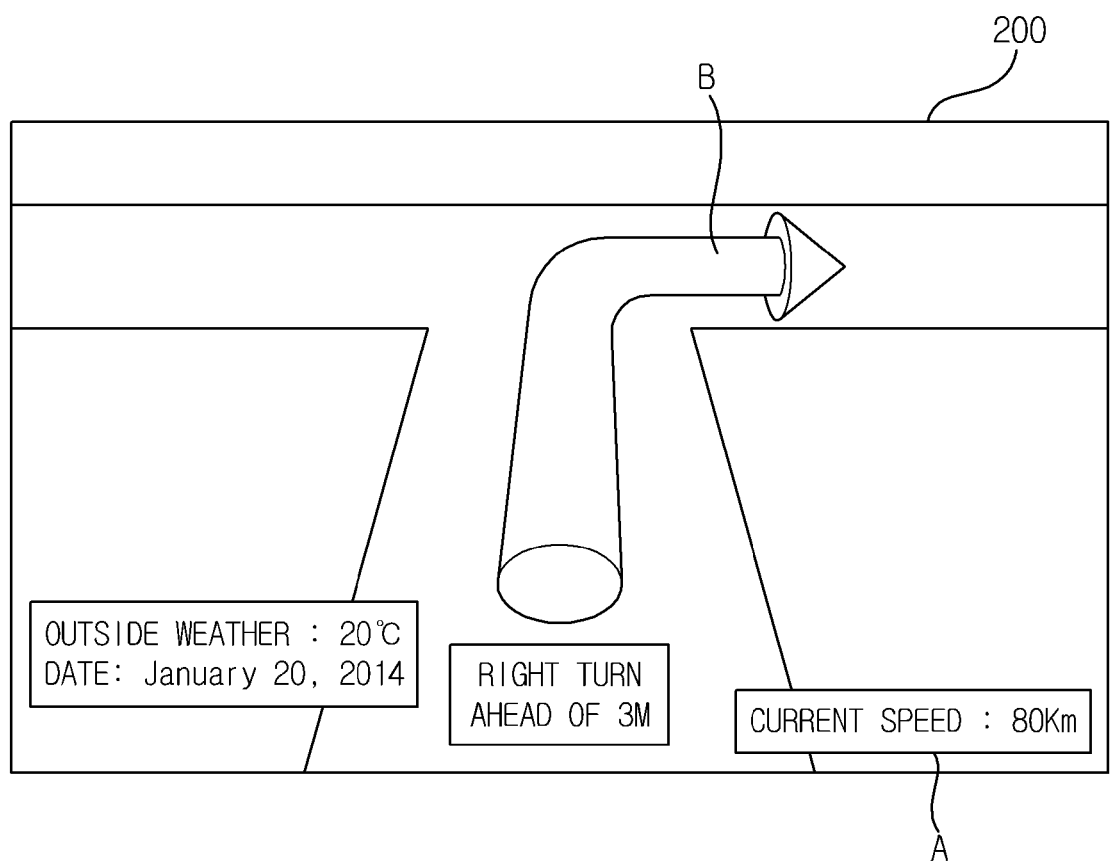
FIG. 8 is an exemplary view illustrating 2D and 3D screens being actually formed in virtual screens.

FIG. 1 is a schematic structural view illustrating a HUD apparatus according to an exemplary embodiment of the present disclosure, FIG. 2 is a schematic view illustrating an operational state of a first optical module, FIG. 3 is a schematic view illustrating a state in which a 2D screen is formed in a virtual image, FIG. 4 is a schematic view illustrating an operational state of a second optical module, FIG. 5 is a schematic view illustrating a state in which a 3D screen is formed in a virtual image, FIG. 6 is a schematic view illustrating a state in which first and second optical modules are all in operation, FIG. 7 is a schematic view illustrating a state in which 2D and 3D screens are formed in virtual images, and FIG. 8 is an exemplary view illustrating 2D and 3D screens being actually formed in virtual screens.

Referring to FIG. 1, a HUD apparatus 100 according to an exemplary embodiment of the present disclosure may include a first optical module 110, a second optical module 120, a separation module 130 and an optical system 140.

The first optical module 110 mounted for displaying 2D image may include a 2D display panel 111 and a first backlight unit 112. At this time, the 2D display panel 111 may be provided by an LCD. The first backlight unit 112 may use an LED and CCFL for a light source to perform a function of supplying illumination for a driver to check an image formed by the 2D display panel 111. At this time, 2D image information may be automatically or manually turned on or turned off by an ON/OFF control of the first backlight unit 112 performed by a predetermined controller or a driver. The first optical module 110 preferably provides a text or figurative information, because the 2D image has an advantage of providing a flat high definition screen. Thus, text-oriented information can be provided using a 2D graphic image.

The second optical module 120 may be arranged to a perpendicular direction relative to the first optical module 110, and may include a 3D display panel 121 and a second backlight unit 122.

At this time, although not illustrated, the 3D display panel 121 may be mounted with a filter configured to determine a polarization direction of the second optical module. The 3D display panel 121 may be formed by any one of lenticular method and a parallax barrier method configured to provide navigation information using a depth adjustment of a virtual screen.

The lenticular method and a parallax barrier method are display panel forming methods for realizing 3D images. That is, the lenticular method uses a plurality of lens arrays to form a 3D image by recognizing a difference of images viewed by a left eye and a right eye. The parallax barrier method is configured such that a plurality of slits is formed at a front end of the 3D display panel 121 to form a 3D image by differentiating an image viewed by a left eye and a right eye. The 3D display panel 121 may be used by any type of glasses-free stereoscopic image display technique panels. This technique is omitted in further detailed explanation because of being of a well known art.

Meantime, an alignment of the first and second optical modules 110, 120 may be set on a mutually vertical position. Of course, although the alignment may be set at a predetermined angle, the angled position may increase volume of the apparatus and complicate an optical path, such that the vertical alignment is preferred if possible.

According to an exemplary embodiment of the present disclosure, the second optical module 120 may be arranged at a floor side as shown in FIG. 1 to provide a 3D image, and the first optical module 110 may be arranged on an optical path perpendicular to the second optical module 120 to provide a 2D image. However, the present disclosure is not limited thereto and positions of first and second optical modules may be changed. Furthermore, the first optical module 110 configured to provide a 2D image may be mounted at a front side of a vehicle, and may be mounted at both sides of the vehicle. The alignment position of the first and second optical modules may be changed at any time as long as a vertical relationship is maintained between the first and second optical modules 110, 120.

The separation module 130 may be configured to totally reflect a light of the first optical module 110 and to project a light of the second optical module 120 by being arranged on an optical path of the first and second optical modules 110, 120. According to an exemplary embodiment of the present disclosure, the separation module 130 may be a PBS (Polarizing Beam Splitter) configured to filter the polarization direction of the first and second optical modules 110, 120.

That is, the separation module 130 may be configured to totally reflect a light of the first optical module 110 to a polarization direction by forming the polarization direction of light of the first optical module 110 at a predetermined level, and to vertically form the polarization direction of the first and second optical modules 110, 120 by forming the polarization direction of light of the second optical module 120, whereby the separation module 130 can be formed to 100% project the light of the second optical module 120 without any loss, and whereby the light of the first and second optical modules 110, 120 can be transmitted to eyes 20 of a driver by reflecting the light of the first and second optical modules 110, 120 to a windshield 10 through the optical system 140 formed with a lens or a mirror.

Meantime, the polarization direction of the first and second optical modules 110, 120 may be determined by directions of polarization films mounted on the first and second optical modules 110, 120. The separation module 130 may be formed with a reflection prism configured to totally reflect a light, instead of using a polarization method depending on types of light sources, where the light of the light source can be projected or totally reflected to the optical system 140 without light loss of the light source because of using an inner total reflection of the prism. In this case, the light source may use a light source that has no bearing on the polarization.

For example, the light of the first optical module 110 may be totally reflected from inside of the reflection prism after being incident on the inside of the reflection prism, and advance, while the light of the second optical module 120 may project and advance without being reflected, whereby the light generated by the first and second optical modules 110, 120 may be transmitted without any light loss.

According to an exemplary embodiment of the present disclosure, the first and second optical modules 110, 120 may be selectively or simultaneously operated.

That is, when sufficient information can be transmitted using a monotonous navigation screen as in the highway travel, or when no separate 3D information is required at a slow travel as in parking in a parking lot, the second optical module 120 is turned off, as illustrated in FIG. 2, and only the first optical module 110 is turned on and a virtual screen may be formed by projecting only 2D information (A) on the window shield 10 as illustrated in FIG. 3.

Alternatively, when complicated navigation information is required as in a city travel or in an intermediate speed travel of 30~60 km, or when information on advertisement of surrounding environments, information on gas station and/or information on price of apartment in driver's view are to be displayed when a vehicle is travelling, using augmented reality, the first optical module 110 is turned off and only the second optical module 120 is operated to allow only 3D image (B) to be projected on the window shield 10 for view by a driver, as illustrated in FIGS. 4 and 5.

At this time, depth (D) of 3D screen can be pulled upward or push HUD backward about a driver for image data processing in terms of software, such that there is no need of moving a virtual image by physically moving a separate mechanical configuration and therefore, it is possible to adjust a position and a depth of a virtual image through image data processing in terms of software. Thus, the driver is enabled to form an information window at an appropriate depth by positively adjusting a position of a virtual image. Furthermore, when a voluminous 3D image is used, a navigation screen may be formed using a 3D figure such as a depth-sensible arrow as illustrated in FIGS. 8, and 2D information and 3D information can be separated for selective view by the driver.

Furthermore, when a complicated navigation screen or travel information of a vehicle is to be checked by selection of a controller or by user selection, both the first and second optical modules 110, 120 are used to project the complicated navigation screen or travel information on the window shield 10 at the same time, as illustrated in FIGS. 6 and 7.

The configuration of virtual screen can be changed without any limitation as necessary, and position of virtual image on a virtual screen can be changed without any mechanical limitation as necessary by selection of vehicle driving travel environment and controller and/or by user selection.

For example, when a driver is situated at a position where gazing position is gradually distanced from a vehicle, as in a travel on a high way, a depth of a 3D screen on a position of a virtual screen formed by the HUD apparatus may be deeply formed at a distant place to correspond to a focus of gaze. Alternatively, a virtual screen of the HUD apparatus is moved to a closer position to correspond to a focused position of gaze when the gaze is concentrated on a vehicle hood or a lower place of license plate of a vehicle ahead during in-city travel or at a slow travel.

Particularly, when a virtual screen is formed using a 3D image as mentioned above, it is possible to provide as realistic information as possible, because 3D image information can be provided to a depth (D) (See FIG. 5) direction relative to a 2D area of predetermined size on screen.

For example, as illustrated in FIG. 8, when a navigation screen such as a moving arrow is displayed in 3D using augmented reality, and numerical information such as travel speed is displayed in 2D, it is possible to efficiently use a space of virtual screen on a narrow HUD apparatus.

Meantime, a distance to a virtual image transmitting a 2D image in operation of HUD apparatus may be constantly fixed. For example, a distance to a virtual image may be constantly maintained so that a 2D image outputted from the first optical module 110 is vividly formed.

Meantime, it is possible to control a size or brightness of first and/or second optical modules 110, 120 in association with a travel speed of a vehicle. For example, when a vehicle is in a stationary state, no hindrance to safe driving is provided even if much information is provided to a driver through 2D and 3D screens. Thus, no great hindrance is provided to driving even if size of graphic information provided through the second optical module 120 is formed in a large size. For example, an icon or graphic image may be popped up to a great size that provides information on real estate price of surrounding building or information on weather based on information on current position.

Meantime, when a vehicle starts to move, the amount of information provided in association with vehicle travel speed may be decreased, and size of provided graphic information may be gradually reduced in association with the vehicle speed. Likewise, information on the first optical module 110 may be also controlled to correspond to the vehicle travel speed. Furthermore, brightness of the first and second optical modules 110, 120 may be controlled to correspond to the vehicle travel speed. For example, information may be provided in a maximum darkness during high speed travel to prevent a driver view from being blocked, and various information may be provided to a driver by brightly providing the information when travel speed is slowed down.

Meantime, mode change of the first and/or second optical modules 110, 120 may be automatically controlled by a predetermined speed detection sensor, by a driver selection or by a mode change. Furthermore, types of information provided through the second optical module 120 and shapes of graphic information may be increased or decreased by driver selection, and size and position that are provided may be also freely adjusted.

As apparent from the foregoing exemplary embodiments of the present disclosure, 2D image or 3D image can be selectively or simultaneously provided to allow providing as maximum information as possible to a driver within a predetermined size of virtual screen. Particularly, in view of the fact that a HUD apparatus mounted on a vehicle is used in day time and at night as well, a daytime visibility can be excelled due to almost no loss of light when the HUD apparatus is mounted in the manner as that of the exemplary embodiments of the present disclosure.

Furthermore, depth and position of a virtual image surface within a virtual screen for transmitting a variety of information can be changed through depth adjustment of 3D image free from hardware change, whereby product stability and reliability can enhanced because no separate operation of adjustment is required after installation of HUD apparatus at an initial optimal position in terms of hardware aspect.

Still furthermore, it is possible to provide much more information than is provided on a same size of area in a screen, when a screen fraught with provision of many images such as frequently moving direction arrow for navi- gation information can be processed with a 3D screen and a screen with text information such as travel speed or distance information can be processed in 2D screen.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

What is claimed is:

1. A head-up display (HUD) apparatus, the HUD apparatus comprising:
    a first optical module configured to display a two dimensional (2D) image;
    a second optical module configured to display a three dimensional (3D) image and arranged at a predetermined angle relative to the first optical module;
    a separation module arranged on an optical path of the first and second optical modules to reflect a light of the first optical module and to project a light from the second optical module; and
    an optical system configured to output the light having passed the separation module,
    wherein the first optical module includes a 2D display panel and a first backlight unit configured to provide a first information as the two dimensional image, and the second optical module includes a 3D display panel and a second backlight unit configured to provide a second information as the three dimensional image,
    wherein the second backlight unit uses one of a lenticular method and a parallax barrier method to provide the three dimensional image,
    wherein the first information includes text and figurative information, and the second information includes three dimensional figure information,
    wherein the second optical module is configured to output augmented reality to provide information of surrounding environments in a driver's view,
    wherein an amount of information outputted on the augmented reality is decreased along with an increase of vehicle speed,
    wherein a position of a virtual screen formed by the HUD is changed to correspond with a focused position of gaze,
    wherein a depth of a 3D screen on the virtual screen formed by the HUD is changed based on travel speed or road type so that a depth of the 3D screen during highway travel is deeper than a depth of the 3D screen during in-city travel, and
    wherein the augmented reality formed by the second optical module is formed as the 3D screen so that a depth of the augmented reality is changed.

2. The HUD apparatus of claim 1, wherein the separation module is a polarizing beam splitter (PBS) configured to filter a polarization direction of light from the first and second optical modules.

3. The HUD apparatus of claim 1, wherein the first and second optical modules are perpendicularly arranged to each other.

4. The HUD apparatus of claim 1, wherein the first and second optical modules are selectively operated.

5. The HUD apparatus of claim 1, wherein the first and second optical modules are simultaneously operated.

6. The HUD apparatus of claim 1, wherein a position of the virtual screen formed by the second optical module is changed by vehicle speed and travel environment information.

7. The HUD apparatus of claim 6, wherein focus of position of the virtual screen is set on a far distance to match a view field of a driver when a vehicle travels at a high speed, and the virtual screen is moved to a near distance of the view field of a driver when a vehicle travels at a slow speed.

8. The HUD apparatus of claim 1, wherein the separation module includes a reflective prism using a total reflection and projection of light from the first and second optical modules, and the light of the first and second optical modules is transmitted without loss using an inner total reflection and projection of light from the reflective prism.

9. The HUD apparatus of claim 1, wherein a size of an output screen of the second optical module is controlled in association with vehicle speed.

10. The HUD apparatus of claim 9, wherein the size of the output screen of the second optical module is increased to a maximum when a vehicle is in a stationary state, and decreased to a minimum when a vehicle is in a travel state.

11. The HUD apparatus of claim 9, wherein brightness of the first and second optical modules is variably controlled in response to vehicle speed.

12. The HUD apparatus of claim 11, wherein brightness of the first and second optical modules is brightest when a vehicle is in a stationary state, and darkest when a vehicle is in a travel state.

13. A method of using a head-up display (HUD) apparatus, the method comprising:
displaying a two dimensional (2D) image using a first optical module of the HUD;
displaying a three dimensional (3D) image using a second optical module of the HUD, wherein the second optical module is arranged at a predetermined angle relative to the first optical module;
reflecting a light of the first optical module to a polarization direction by forming the polarization direction of the light of the first optical module at a predetermined level; and
vertically forming the polarization direction of the first and second optical modules by forming the polarization direction of light of the second optical module,
wherein the first optical module includes a 2D display panel and a first backlight unit configured to provide a first information as the two dimensional image, and the second optical module includes a 3D display panel and a second backlight unit configured to provide a second information as the three dimensional image,
wherein the second backlight unit uses one of a lenticular method and a parallax barrier method to provide the three dimensional image,
wherein the first information includes text and figurative information, and the second information includes three dimensional figure information,
wherein the second optical module is configured to output augmented reality to provide information of surrounding environments in a driver's view,
wherein an amount of information outputted on the augmented reality is decreased along with an increase of vehicle speed,
wherein a position of a virtual screen formed by the HUD is changed to correspond with a focused position of gaze,
wherein a depth of a 3D screen on the virtual screen formed by the HUD is changed based on travel speed or road type so that a depth of the 3D screen during highway travel is deeper than a depth of the 3D screen during in-city travel, and
wherein the augmented reality formed by the second optical module is formed as the 3D screen so that a depth of the augmented reality is changed.

14. The method of claim 13, wherein a separation module is used to perform the reflecting of the light of the first optical module and the vertically forming of the polarization direction of the first and second optical modules.

15. The method of claim 14, wherein the separation module includes a reflective prism using a total reflection and projection of light from the first and second optical modules, and the light of the first and second optical modules is transmitted without loss using an inner total reflection and projection of light from the reflective prism.

16. The method of claim 14, wherein the separation module is a polarizing beam splitter (PBS) configured to filter the polarization direction of light from the first and second optical modules.

* * * * *